US006970692B2

(12) United States Patent
Tysor

(10) Patent No.: US 6,970,692 B2
(45) Date of Patent: Nov. 29, 2005

(54) CELL PHONE MINUTE USAGE CALCULATION AND DISPLAY

(75) Inventor: Arthur James Tysor, Buda, TX (US)

(73) Assignee: International Business Machines Corporation, Armonk, NY (US)

(*) Notice: Subject to any disclaimer, the term of this patent is extended or adjusted under 35 U.S.C. 154(b) by 549 days.

(21) Appl. No.: 09/833,416

(22) Filed: Apr. 12, 2001

(65) Prior Publication Data

US 2002/0151293 A1 Oct. 17, 2002

(51) Int. Cl.[7] .......... H04M 11/00

(52) U.S. Cl. .......... 455/405; 455/406; 455/414.1; 455/566

(58) Field of Search .......... 455/405–408, 455/414.1, 422.1, 566, 550.1

(56) References Cited

U.S. PATENT DOCUMENTS

| | | | | |
|---|---|---|---|---|
| 4,200,771 A | | 4/1980 | Kraushaar et al. | |
| 5,291,543 A | | 3/1994 | Freese et al. | |
| 5,684,861 A | * | 11/1997 | Lewis et al. | 455/405 |
| 5,826,185 A | * | 10/1998 | Wise et al. | 455/405 |
| 5,875,393 A | | 2/1999 | Altschul et al. | |
| 5,943,406 A | | 8/1999 | Leta et al. | |
| 5,960,070 A | | 9/1999 | O'Donovan | |
| 5,966,509 A | | 10/1999 | Abe et al. | |
| 5,983,091 A | | 11/1999 | Rodriguez | |
| 6,044,258 A | * | 3/2000 | Abdella | 455/405 |
| 6,112,077 A | | 8/2000 | Spitaletta et al. | |
| 6,138,002 A | | 10/2000 | Alperovich et al. | |
| 6,198,915 B1 | | 3/2001 | McGregor et al. | |
| 6,282,435 B1 | * | 8/2001 | Wagner et al. | 455/566 |
| 6,466,783 B2 | * | 10/2002 | Dahm et al. | 455/414.2 |
| 6,493,547 B1 | * | 12/2002 | Raith | 455/405 |
| 6,556,817 B1 | * | 4/2003 | Souissi et al. | 455/406 |
| 6,564,047 B1 | * | 5/2003 | Steele et al. | 455/405 |
| 6,684,066 B1 | * | 1/2004 | Kaplan | 455/405 |

FOREIGN PATENT DOCUMENTS

| | | | | |
|---|---|---|---|---|
| EP | 0 813 332 | * | 12/1997 | H04M 15/28 |
| EP | 0 813 332 A1 | * | 12/1997 | H04M 15/28 |

OTHER PUBLICATIONS

Nokia 3210, www.nokia.com/phones/3210/specifications/index.html; Jan. 5, 2001.

* cited by examiner

*Primary Examiner*—William Trost
*Assistant Examiner*—Brandon J. Miller
(74) *Attorney, Agent, or Firm*—Volel Emile; Dillon & Yudell LLP

(57) ABSTRACT

A method for providing a cellular phone user with accurate feedback of available minutes in a service plan based on specific plan usage is disclosed. A user enters service plan information including the time period of the plan, the number of peak minutes, the number of off-peak minutes, and other features associated with the plan on his cellular phone. The entered information is stored in the cellular phone's memory. Minute usage is tracked and a display of available minutes is provided to the user.

20 Claims, 7 Drawing Sheets

CELL PHONE MINUTE USAGE CALCULATION AND DISPLAY

BACKGROUND OF THE INVENTION

1. Technical Field

The present invention relates in general to cellular telephones, and in particular to user features of cellular telephones. Still more particularly, the present invention relates to a method and system for providing continuous monitoring and displaying of available service plan minutes on cellular telephones.

2. Description of the Related Art

The utilization of cellular telephones (cell phones) is becoming increasingly popular in today's wireless environment. Cellular phone service is provided for both business use and personal use via individual cell phones which connect to particular cellular service providers, such as Sprint and GTE.

The popularity of cellular phones has led to a growing desire for improvements in hardware and software for user satisfaction. The major improvements have included the creation of light-weight phones and inclusion of advanced features, such as web access, call waiting, caller ID, time display, etc. Some of these features are provided as a menu option that may be enabled or disabled, i.e., turned on or off by the user.

Cellular service is usually provided with a monthly or annual payment agreement between the subscriber and the cellular service provider. Typically, each cellular subscriber selects a service plan that includes a set number of daytime or peak minutes and another set number of night and weekend or off-peak minutes in a set period or cycle (usually monthly) for a given price (e.g., 120 minutes peak, 300 off-peak for $29.99). Cell phone users select from among a multitude of rate plans, each offering differing amounts of minutes during differing times of the day or week. Typically, the user selects a rate plan based on cost and associated minutes available within the plan. One major problem faced by users of these rate plans is that often the user goes over the available minutes in the rate plan and ends up having to pay significantly more than desired because of the over calls. With current cellular phones, the user often has no way of knowing the number of minutes remaining in his service plan or when his/her minute usage has reached its peak for the month.

Whenever a subscriber utilizes more minutes in a given cycle than allotted in his/her service plan, the subscriber is charged a premium for the over calls. This premium can be very expensive and often subscribers are forced to pay double the expected rate for a small number of over the rate calls. Because of this, many subscribers are careful in using their minutes and try not to go over the allotted minutes.

Most current cell phones include features to provide the subscriber with a running total of all calls made from the cell phone. The subscriber typically has to reset the minute count at the beginning of the cycle (or period) and then remember to check the amount of minutes used on a periodic basis. Also, some cellular service providers provide a call in number that keeps track of minute usage during the period or provide online information via a customer accessible web site.

The menu items for minute tracking available on most cell phones allow the user to clear timers, view duration of the last call, view duration of all calls made since timers were cleared, and view life timer. However, as stated above, these timers only provide inclusive totals, which is not very informative to the user having a service plan that includes different minute allotments for different times (peak versus off-peak, etc.). Additionally, the present timers require a manual reset by the user and do not allow the user to easily view remaining minutes in his/her service plan.

The present invention recognizes that it would be desirable to provide a user with an accurate count of minute usage delineated by peak, off-peak, and other criteria within a particular service plan. A method and system by which the number of minutes available in a specific cycle is displayed to a user would be a welcomed improvement. These and other benefits are provided by the invention described herein.

SUMMARY OF THE INVENTION

A method for providing a cellular phone user with accurate feedback of available minutes in a service plan based on specific minute usage is disclosed. A user enters service plan information including the time period of the plan, the number of peak minutes, the number of off-peak minutes, and other features associated with the plan on his cellular phone. The entered information is stored in the cellular phone's memory. Minute usage is tracked and a display of available minutes is provided to the user.

The display may be toggled on/off with a time usage menu option and may include a decreasing time bar for each separate time period in the service plan. Additionally, the cellular phone may be programmed to alert the user whenever he/she approaches the end of the plan amount prior to the end of the plan cycle. In one embodiment, the alert is audible. In other embodiments, the alert is provided by a flashing of the graphical bar on the phone's display screen.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
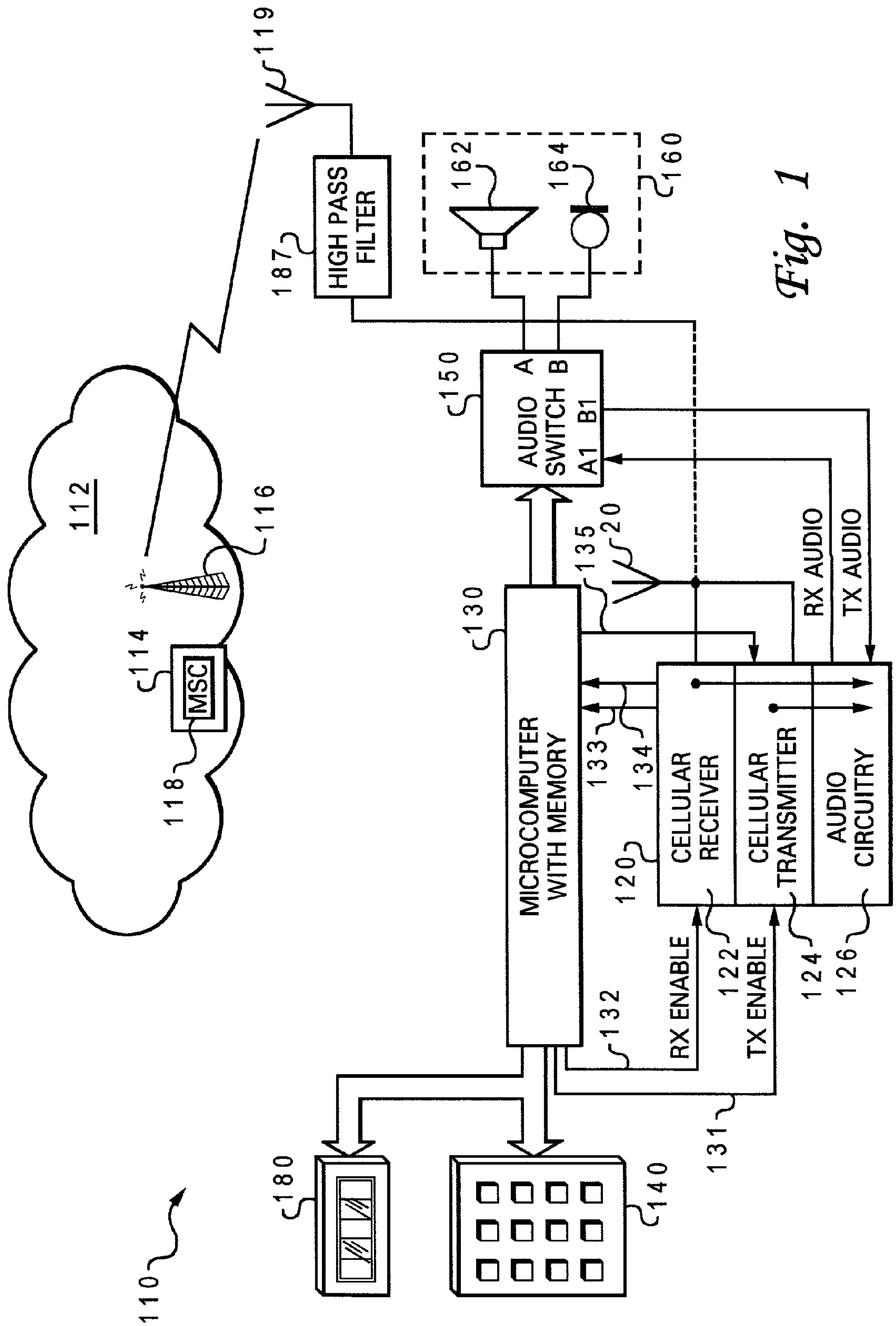
FIG. 1 illustrates a block diagram of component parts of a cellular telephone system in which a preferred embodiment of the present invention may be implemented.

With reference now to the figures and in particular with reference to FIG. 1, there is depicted a block diagram of component parts of a cellular telephone 110 in which a preferred embodiment of the present invention may be implemented. Those skilled in the art will appreciate that other types of wireless telephone systems may be utilized in accordance with a preferred embodiment of the present invention and that cellular telephone 110 as described herein is only one such embodiment that is presented for illustrative purposes only. Cellular telephone 110 communicates with a provider service via cellular network 112 that typically includes base station 114 having base station antenna 116 and mobile switching center (MSC) 118. MSC 118 is a switch that provides services and coordination between mobile wireless telephone users in a cellular network 112 and other external networks. MSC 118 controls system operations in analog and digital cellular networks. For example, MSC 118 controls calls, tracks billing information, and locates wireless subscribers. In one embodiment, MSC 118 also downloads information about a subscriber's service plan to the cellular phone from the provider's database as discussed further below.

Cellular phone 110 includes antenna 119 for transmitting and receiving signals over wireless radio channels. Cellular phone 110 also includes wireless telephone transceiver 120, microcomputer 130, keypad 140, display 180, audio switch 150, and audio interface 160, including speaker 162 and microphone 164. Microcomputer 130 is a computer built around a single chip microprocessor. Less powerful than mini-computers and mainframe computers, microcomputer 130 is nevertheless capable of complex tasks involving the processing of logical operations. Microcomputer 130 includes a central processing unit (CPU) (i.e., not shown), which is the computational and control unit of microcomputer 130, and which interprets and executes instructions for cellular phone 110. Microcomputer 130 further includes memory component (not shown) in which available minute display code and user-inputted data, including minute usage data utilized by the present invention, are stored.

Display 180 can be any type of display device which visually presents data to a radio telephone user. Display devices such as a liquid crystal display or a plasma display can be utilized to implement display 180. Display 180, when utilized in the present invention, preferably provides clear textual and/or graphical representations such that visible output is clearly legible to a user.

Keypad 140 comprises a set of keys or depressible buttons that are mounted on a small keyboard and are dedicated to a specific purpose, such as receiving numerical input or feature selection. Keypad 140 is preferably modeled after the standard telephone keypad. The architecture and control of the illustrated radio telephone is for illustrative purposes only and should not be utilized to limit the scope of the present invention.

Figure 2:
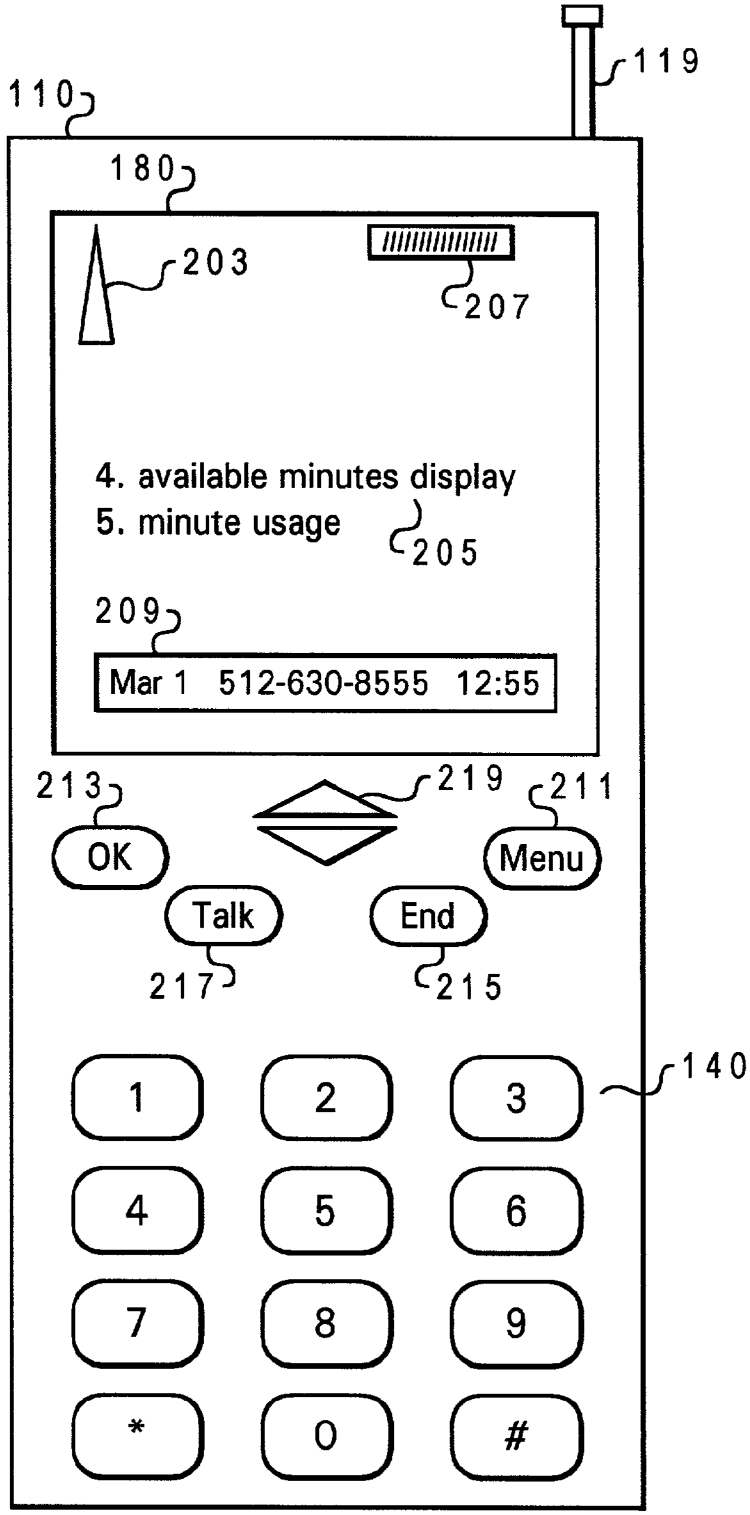
FIG. 2 depicts a frontal view of a cellular telephone in accordance with one embodiment of the present invention.

FIG. 2 illustrates one embodiment of a frontal view of an assembled cellular phone 110 with display screen and selectable option buttons (keypad 140 and other functional buttons). Display screen 180 of cellular phone 110 displays selectable "Available Minutes" menu item 205. Also visible on display screen 180 are battery power icon 207, greeting bar 209 with date, cell number, time stamps, and signal icon 203. Cellular telephone also includes alphanumeric keypad 140, menu button 211, OK button 213, end button 215 and talk button 217. Also included are up and down scroll buttons 219 by which the user may scroll through the various input options requiring input to complete the features of the invention. Cellular phone 110 may also include various other components. However these additional components are not necessary for the description of the invention and not provided herein.

As illustrated in FIG. 2, the present invention adds at least one menu item, available minutes 205, to the menu content available on cellular telephone 110. In the preferred embodiment, general menu item, "Available Minutes" 205 is added to the list of available top level selectable menu items within the calls history menu. Specifically, the Available Minutes menu may be added as a sub-component of the Air Time option available on most standard cellular phones. As further described with reference to FIG. 3, selection of Available Minutes 205 by a user provides a series of input request, by which the user may input rate plan information to setup the features of dynamic monitoring of minute usage and displaying of available minutes as provided by the present invention.

Figure 3:
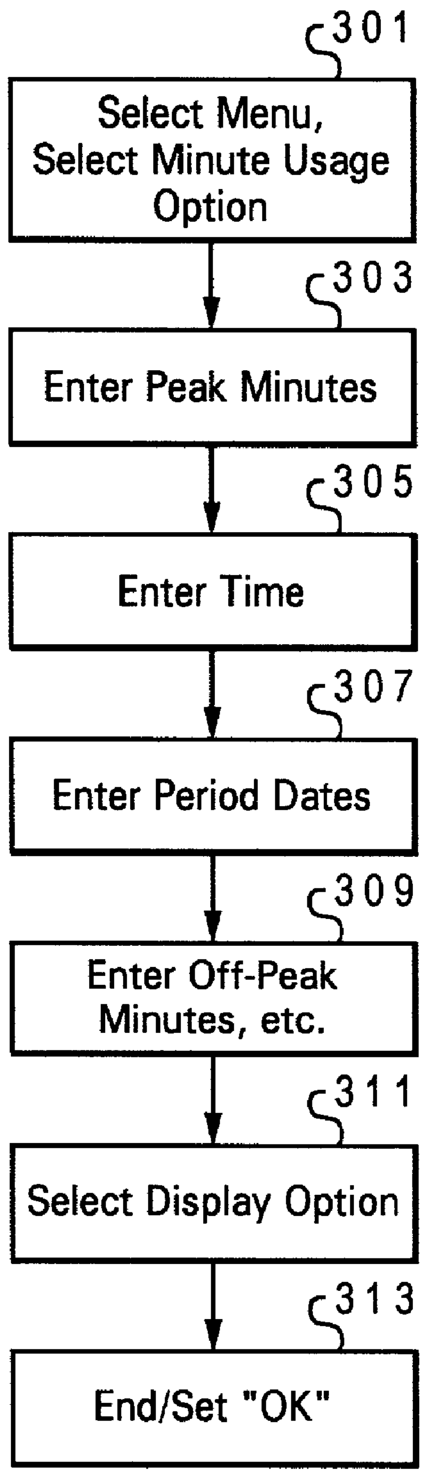
FIG. 3 is a high level flow chart of the process of entering service plan and available minute display information on a cellular telephone in accordance with one embodiment of the present invention.

Thus, according to FIG. 3, a user first selects rate usage from the menu options as shown at block 301. In response to the selection, the user is provided with a scrollable list of input requests. As illustrated at block 303, the user is prompted to enter the number of minutes allowed on the first rate tier (peak period). The user is then prompted for the associated time (beginning and end times along with the days of the week) as shown at block 305, then the associated cycle (day of the month the plan begins) at block 307. Following, the user enters the number of minutes provided on the second rate tier (off-peak period), along with days of the week and time as depicted at block 309. Once the plan information has been inputted, the user may then select, at block 311, the method by which he wishes to view the available minutes for the first and/or second rate tier i.e., whether he desires a graphical representation or an actual numerical output, or both. The user then selects OK button 313 to complete the setup procedure.

Although only two periods are provided in the description of the invention, it is understood that any number of periods, each having different minute allocations is possible within the invention. The user is prompted for all periods, associated minutes and times during the setup process on the cellular phone.

In one embodiment, the number of different periods is requested prior to the request for specific period information and the output adjusted to reflect the number entered by the user in response to this request.

In another embodiment, the user may also select whether he wishes the available minutes output to be continuously displayed or displayed at the termination of each call. In yet another embodiment, utilized primarily with the graphical bar display, the user may enable an option to receive an audible notification when the available minutes reaches a particular threshold (e.g., 5 minutes remaining). In one embodiment, graphical bar display also flashes to alert the user when the threshold is reached.

In the preferred embodiment, entering of the rate plan information is completed only once on the cellular phone, unless the plan changes. Also, the available minutes is automatically reset by the CPU at the beginning of the next cycle. In another embodiment, the rate plan is programmed into the cell phone by the service provider and the user does not have to enter any of the rate plan information. Additionally, the available minutes may be automatically downloaded from the service provider's database at the termination of each call and displayed to the user. With this embodiment, however, additional bandwidth is required for the download and, thus, this embodiment is not preferred.

When the user receives the bill for service from the previous month, the user is able to revisit the actual usage information still stored on the cellular phone by viewing the minutes used during the previous month, delineated by peak and off-peak minutes, which is held in memory until the end of the next cycle. In this manner, the user can determine the accuracy of the bills against his actual recorded usage.

The following example provides specific service plan information which may be entered by a user having a rate plan of 120 peak minutes a month with an additional 500 minutes of nights and weekend (off-peak minutes) usage (i.e., 120 Minutes: M,T,W,R,F:8AM–8PM and 500 Minutes: F:8PM–M:8AM). As mentioned above, more than two periods are possible and the present example is for illustrative purposes only and not meant to be limiting on the invention. For the present example, the actual time used is rounded up to the next whole minute value. Thus, accordingly, the user enters the information as follows:

peak: 120, M–F, 800, 800 [scroll]
off-peak: 500, N, S, S [scroll]
continuous: (y) (n) [select one, scroll]
Display bar: (y) (n) [select one, scroll]
cycle start day: 20
[OK]

In the above-example, N represents nights, and bracketed items represent user scrolling. The user enters the items following the colon(:), then scrolls down to the next selection. When only a peak and off-peak period re required, only the peak period times are entered and the other times are set for off-peak periods automatically.

The cycle start day entry allows the user to enter the monthly billing date, which is usually the day of the month that the billing period starts. The various selectable options may be overridden if the user wants to control the billing cycle manually. Also, some information, such as the peak period days (M–F) may be provided as default and changed by the user only if necessary. For some rate plans, the user may also need to enter in whether the minutes used are rounded up to the next full minute or calculated to the nearest second. Additionally, in another embodiment, the user is able to specify whether the first incoming minute is free, whereby the first incoming minute is not counted against the total usage when it is free. Once the user has completed his selections, selecting the OK button 219 stores the information and activates the monitoring and displaying features of the invention.

The cellular phone automatically tracks the minute usage according to the time of the day and day of the week and keeps a record that may be viewed. In the preferred embodiment, the record is displayed on the display screen after each call. In another embodiment, the record is provided on a continuous basis for viewing at any time. In yet another embodiment, the record is stored and may be viewed utilizing the phone's menus. Further, in the preferred embodiment, the record is automatically displayed whenever the cellular phone is powered-up.

Figure 4:
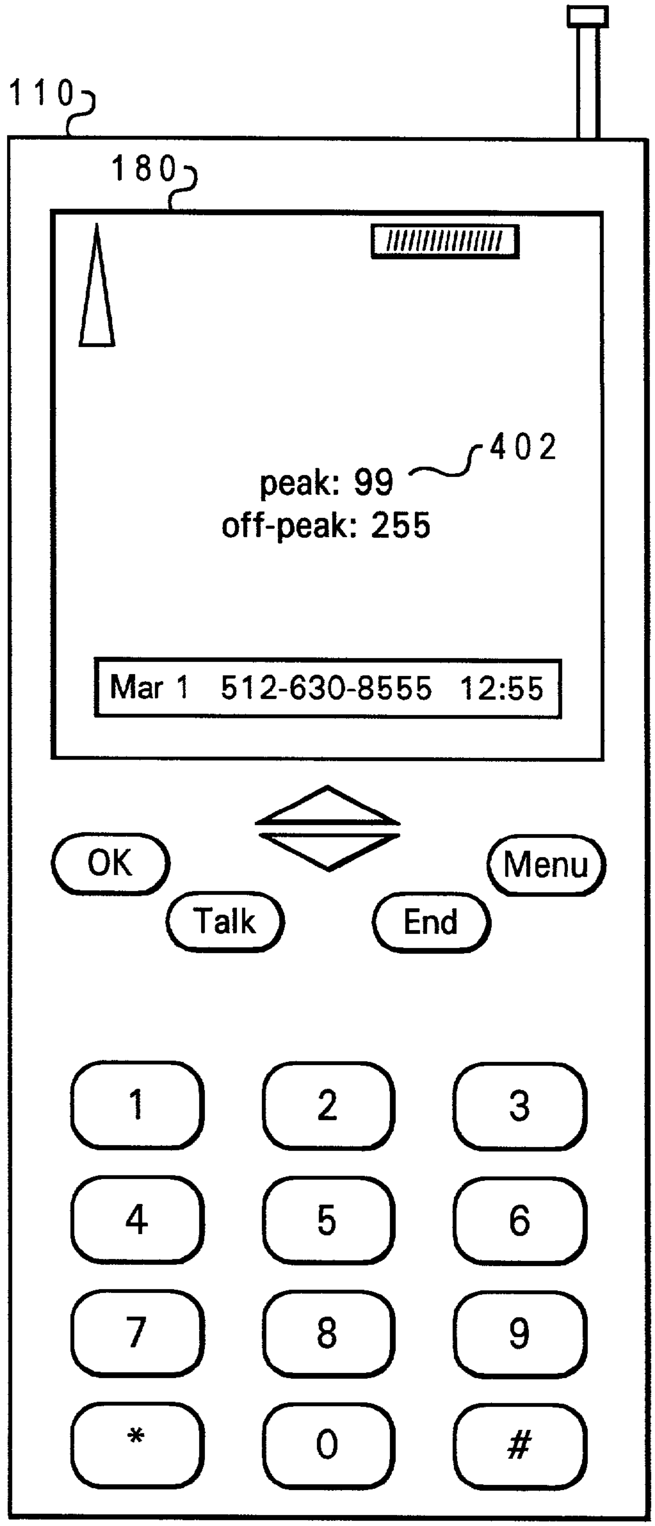
FIG. 4 depicts a display screen of a cellular phone with a numerical display of available minutes in accordance with one embodiment of the present invention.
Figure 5A:
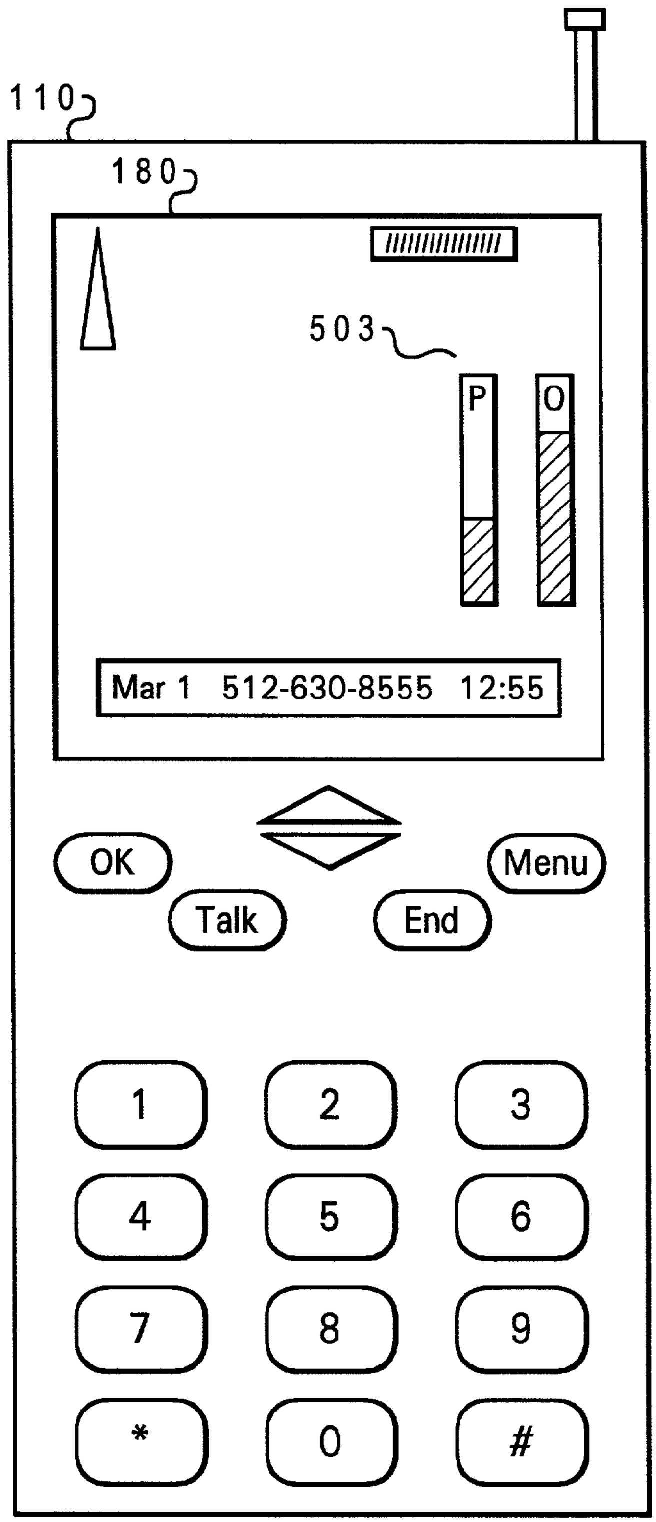
FIG. 5A depicts another display screen of a cellular phone with available minutes displayed with graphical bars in accordance with one embodiment of the present invention.

FIG. 4 illustrates display screen 180 of cellular phone 110 with minute usage 402 (i.e., available minutes) displayed numerically within display screen 180. All other components of cellular phone 110 are similar to those of FIG. 2 and are therefore not further described. FIG. 5A illustrates another embodiment in which graphical bars 503 are utilized to represent the available time and displayed within display screen 180. The exact location of the displayed information on the display screen 180 may vary based on manufacturer's preference/design. As illustrated in FIG. 5A, two vertical graphical bars are provided, one for peak period (p) and the other for off-peak period (o). However, a single graphical bar representation may be utilized that depicts available time for the current period based on the present clock time (i.e., representing only minutes available for peak time during peak hours).

Figure 5B:
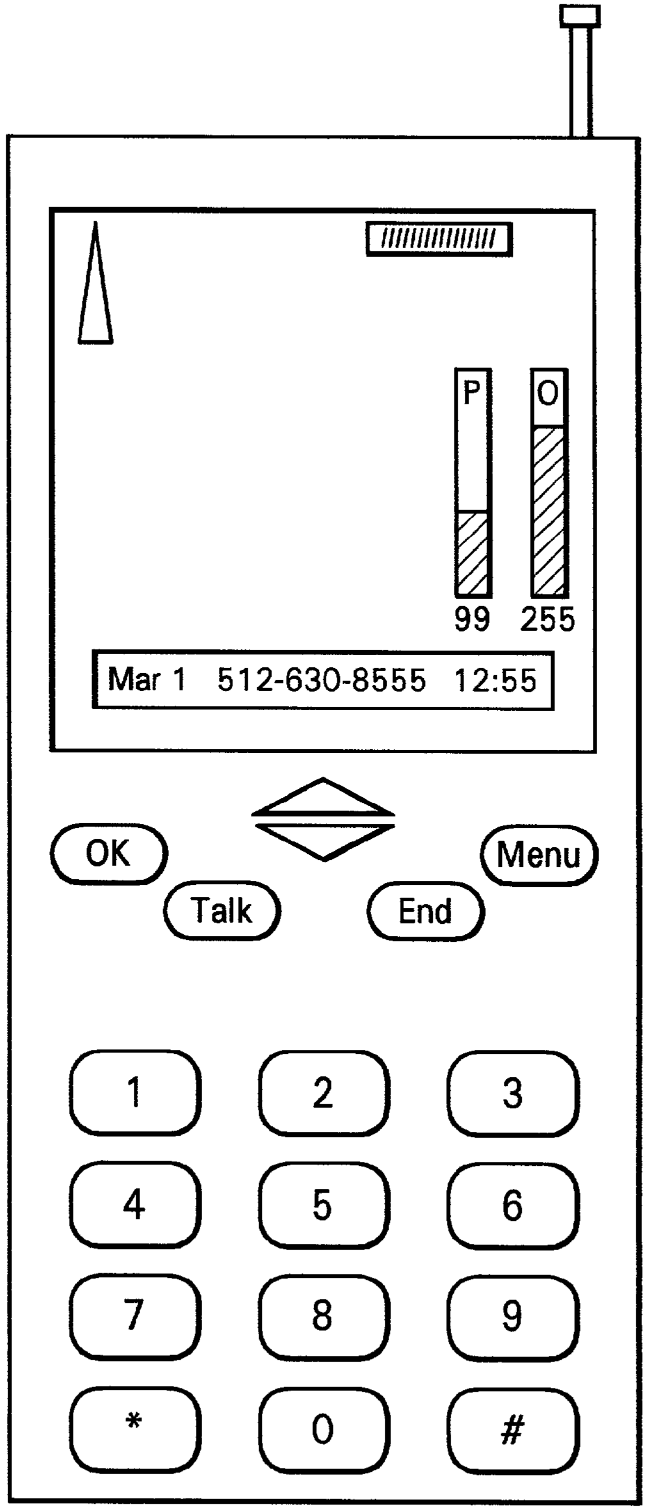
FIG. 5B depicts a combination display of numerical and graphical representation of available minutes in accordance with one embodiment of the present invention.

Graphical bars 503 may be displayed either horizontally or vertically. Graphical bars 503 may be scaled to show the currently available or remaining minutes for that billing cycle as a percent of the total available minutes in the rate plan. Alternatively, with cellular phones on which the display screen's real estate permits, as shown in FIG. 5B, graphical bars 503 may be displayed along with the numerical presentation of the available minutes.

When the current billing period ends, the current month usage is stored in memory on the cellular phone as a previous month's usage, and the numerical or graphical timers display(s) is automatically reset. If the user does not specify the billing period during setup of the graphical time display, the user may clear the timer(s) manually. Then, at any time up until the next billing period, the user is able to view the previous month's usage.

Figure 6:
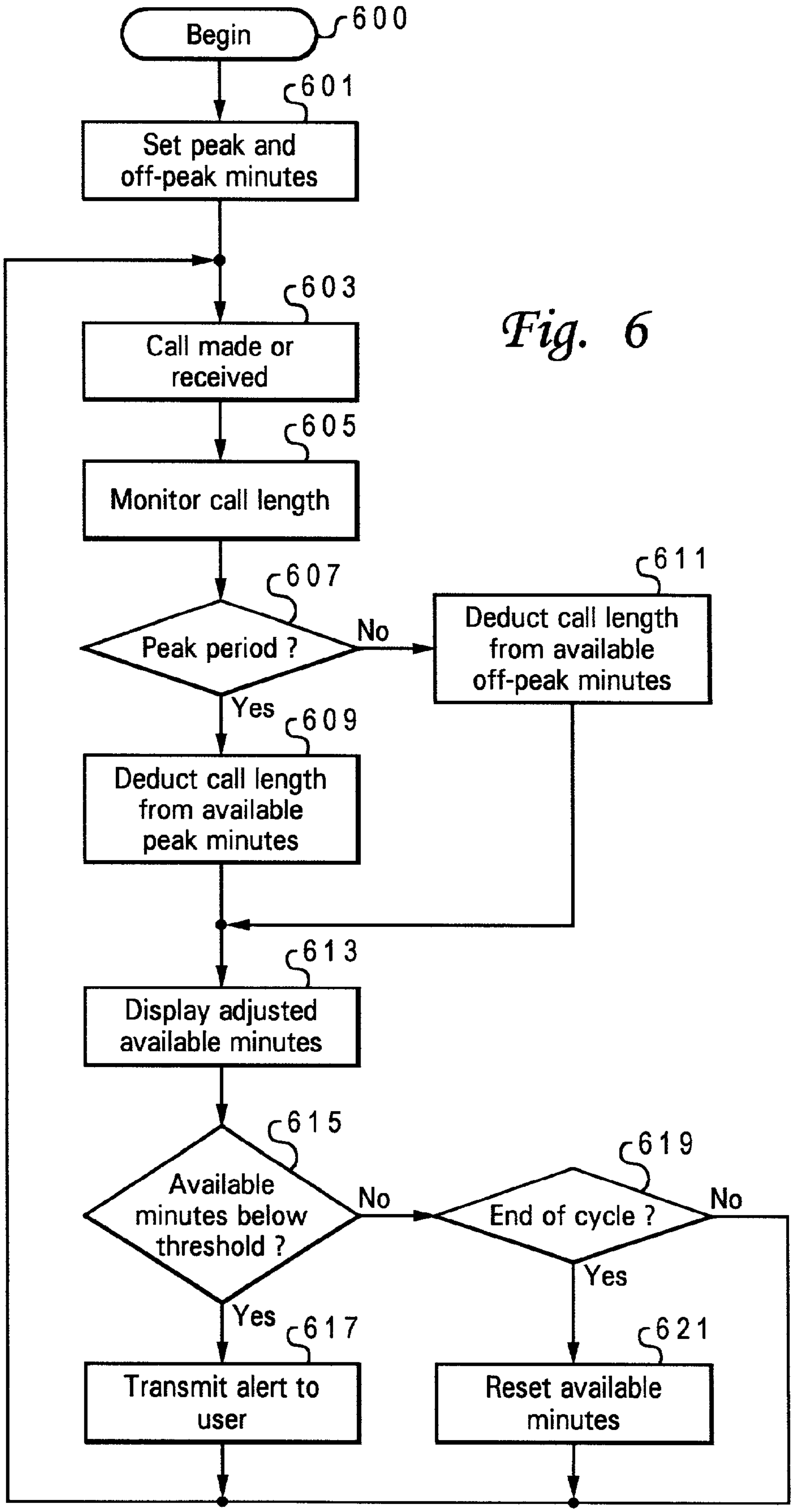
FIG. 6 is a high level flow diagram of a process of providing visible feedback in response to minute usage in accordance with one embodiment of the present invention.

Referring now to FIG. 6, a high level flow chart in accordance with the present invention is depicted. The process begins at block 600 and thereafter proceeds to block 601, where a user first enters the service plan information on the cellular phone. A call is then made or received on the cellular phone as shown at block 603. The length of the call is monitored as indicated at block 605, and then a determination made at block 607 whether the call occurred during peak period or off-peak period. When the call occurred during peak period, the length of the call is deducted from the available number of minutes remaining for that peak period as shown at block 609. However, when the call occurred during off-peak period the deduction is made from the remaining minutes of the off-peak plan period as shown at block 611. The remaining minutes are then displayed on the display screen of the cellular phone at block 613.

A determination is then made at block 615 whether the available minutes fall below a preset threshold. If the minutes fall below the preset threshold, the user is provided with an alert as illustrated at block 617. Following, a check is made at block 619 whether the plan cycle has ended. When the plan cycle ends, the system resets the available minutes for the peak and off-peak periods as shown at block 621, and a new monitoring cycle is commenced. Otherwise, the process of monitoring calls and deducting the call time from available minutes continues for the present plan cycle.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as Read Only Memories (ROMs) or Erasable, Electrically Programmable Read Only Memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. In a single unit cellular telephone with internal processor and memory and built-in display device and keyboard, a method of tracking available service plan minutes for a user of the cellular phone, comprising:

providing a user-selectable option for tracking available usage time remaining within said service plan minutes, said user-selectable option being provided within a menu of available options provided by internalized applications of said cellular telephone;

prompting a user for user-input of options for tracking service plan information and displaying available minutes information on said built-in display device, wherein said displaying information is selected from among displaying actual available minutes and displaying a time tracking bar indicative of a percentage of available minutes remaining, wherein said prompting is initiated when the available usage time menu option is selected;

recording and storing service plan information in the memory of said cellular phone;

monitoring time usage for calls on said cellular phone via said internal processor and memory; and displaying available time of said service plan on the built-in display device of said cellular phone.

2. The method of claim 1, wherein said service plan information includes a number of peak period minutes and off-peak period minutes and wherein:

said monitoring step further comprises separately monitoring said peak period minutes and said off-peak period minutes; and said displaying step further comprises separately displaying a first available minutes output associated with said peak period minutes and a second available minutes output associated with said off-peak period minutes;

wherein said displaying displays said first and said second available minutes output as a numerical value when numerical display option is selected and said displaying displays the time tracking bar when time-bar display option is selected.

3. The method of claim 2, wherein said displaying step displays only said first available minutes output during a clock time associated wit said peak period minutes and displays only said second available minutes output during a next dock time associated with said off-peak period minutes.

4. The method of claim 2, further comprising:

pre-selecting a non-zero threshold number of minutes of time at which to alert a user that the available usage time within said service plan is approaching zero; and outputting an alert signal when said available minutes reaches the pre-selected non-zero threshold, whereby said user is able to refrain from exceeding a total number of minutes within said service plan.

5. The method of claim 4, wherein said displaying step includes providing said alert signal by flashing said display.

6. The method of claim 1, wherein, when concurrent display is selected by a user, said displaying step concurrently displays both a numerical output and said graphical bar.

7. A cellular telephone comprising:

an internal processor and associated memory;

a built-in display device; and program code executed by said internal processor for tracking available service plan minutes for a user of said cellular phone, comprising code for:

providing a user-selectable option for tracking available usage time remaining within said service plan minutes, said user-selectable option being provided within a menu of available options provided by internalized applications of said cellular telephone;

prompting a user for user-input of options for tracking service plan information and displaying available minutes information on said built-in display device, wherein said displaying information is selected from among displaying actual available minutes and displaying time tracking bar indicative of a percentage of available minutes remaining, wherein said prompting is initiated when the available usage time menu option is selected;

recording and storing service plan information in the memory of said cellular phone;

monitoring time usage for calls on said cellular phone via said internal processor and memory; and displaying available time of said service plan on the built-in display device of said cellular phone.

8. The cellular telephone of claim 7, wherein said service plan information includes a number of peak period minutes and off-peak period minutes and wherein:

said monitoring program code further comprises code for separately monitoring said peak period minutes and said off-peak period minutes; and said displaying program code further comprises code for separately displaying a first available minutes output associated with said peak period minutes and a second available minutes output associated wit said off-peak period minutes;

wherein said displaying program code displays only said first available minutes output during a clock time associated with said peak period minutes and displays only said second available minutes output during a next clock time associated with said off-peak period minutes;

wherein said displaying displays said first and said second available minutes output as a numerical value when numerical display option is selected and said displaying displays the time tracking bar when time-bar display option is selected.

9. The cellular telephone of claim 8, further comprising:

program code for pre-selecting a non-zero threshold number of minutes of time at which to alert a user tat the available usage time within said service plan is approaching zero; and program code for outputting an alert signal when said available minutes teaches the pre-selected non-zero threshold, whereby said user is able to refrain from exceeding a total number of minutes within said service plan.

10. The cellular telephone of claim 8, wherein said displaying program code includes code for flashing said display to provide said alert signal.

11. The cellular telephone of claim 8, wherein:

said program code for prompting for user entry of display information includes code for enabling selection of concurrent display whereby said displaying program code concurrently displays both a numerical output and said graphical bar.

12. A cellular telephone system comprising a service provider;

at least one cellular telephone that is provided cellular service via said service provider;

means for tracking minute usage for calls on said cellular phone; and means for providing a user of said cellular phone with a display of available minutes in a service plan associated with said cellular phone, wherein said available minutes are displayed as a graphical bar on a display device built into said cellular phone and said graphical bar is displayed at one or more of a number of programmed display periods including: at power on of said cellular telephone; at completion of each cellular call; at a user request for display of available minutes; and continuously while said display device is on.

13. The cellular telephone system of claim 12, wherein:

said tracking means includes monitoring said minute usage at a database of said service provider of said service plan; and said providing means includes transmitting an available minutes output to said cellular phone at a termination of each of said calls, wherein said display includes said transmitted available minutes output.

14. The cellular telephone system of claim 12, wherein said service plan information includes a number of peak period minutes and off-peak period minutes and wherein said cellular telephone comprises:

a processor and associated memory;

a display device; and program code executed by said processor for tracking available service plan minutes for a user of said cellular phone, comprising code for:

recording service plan information on said cellular phone;

monitoring minute usage for calls on said cellular phone, wherein said monitoring program code includes code for separately monitoring said peak period inmates and said off-peak period minutes; and displaying available minutes of said service plan on said display device, wherein said displaying program code includes code for separately displaying a first available minutes output associated wit said peak period minutes and a second available minutes output associated with said off-peak period minutes.

15. The cellular telephone of claim 7, wherein said program code for implementing said displaying step includes code for displaying said available minutes at one or more of a number of programmed display periods including: at power on of said cellular telephone; at completion of each cellular call; at a user request for display of available minutes; and continuously while said display device is on.

16. The cellular telephone of claim 7, further comprising:

program code for automatically downloading service plan information from a service provider during power up of said cellular telephone; and program code for receiving periodic updates of said available time from said service provider.

17. The cellular telephone of claim 7, wherein when said service plan tracks and deducts time usage in time blocks other than whole minute blocks, said program code for implementing the monitoring step includes:

program code for tacking available time based on a number of said blocks of time remaining; and program code for displaying said available time with an indication of a smallest number of blocks other than whole minutes that is available.

18. The cellular telephone of claim 7, wherein said program code for implementing said tracking step includes code for completing an available time calculation that accounts for a preprogrammed time offset including deducting a first minute when said first minute is free for incoming calls.

19. The cellular telephone system of claim 12, wherein the cellular phone further comprises means for displaying available minutes information on a display device of the cellular phone, wherein said means for displaying includes selecting from among displaying actual available minutes in numerical form and displaying a time tracking bar indicative of a percentage/amount of available minutes remaining.

20. The cellular telephone system of claim 12, wherein the cellular phone further comprises:

means for pre-selecting a non-zero threshold number of minutes of time at which to alert a user that the available usage time within said service plan is approaching zero; and means for outputting an alert signal when said available minutes reaches the pre-selected non-zero threshold, whereby said user is able to refrain from exceeding a total number of minutes within said service plan.

* * * * *